(12) United States Patent
Nakata et al.

(10) Patent No.: US 9,718,113 B2
(45) Date of Patent: Aug. 1, 2017

(54) PRESS-FORMED PRODUCT

(71) Applicants: NIPPON STEEL & SUMITOMO METAL CORPORATION, Tokyo (JP); TOYODA IRON WORKS CO., LTD., Aichi (JP)

(72) Inventors: Masahiro Nakata, Tokyo (JP); Toshiya Suzuki, Tokyo (JP); Tomokichi Tokuda, Tokyo (JP); Masanobu Ichikawa, Aichi (JP); Nobuyuki Ichimaru, Aichi (JP)

(73) Assignees: NIPPON STEEL & SUMITOMO METAL CORPORATION, Tokyo (JP); TOYODA IRON WORKS CO., LTD., Aichi (JP)

( * ) Notice: Subject to any disclaimer, the term of this patent is extended or adjusted under 35 U.S.C. 154(b) by 309 days.

(21) Appl. No.: 14/367,257

(22) PCT Filed: Dec. 20, 2012

(86) PCT No.: PCT/JP2012/083141
§ 371 (c)(1),
(2) Date: Jun. 20, 2014

(87) PCT Pub. No.: WO2013/094705
PCT Pub. Date: Jun. 27, 2013

(65) Prior Publication Data
US 2014/0356643 A1 Dec. 4, 2014

(30) Foreign Application Priority Data
Dec. 22, 2011 (JP) .................................. 2011-281465

(51) Int. Cl.
*B21D 53/88* (2006.01)
*B21D 22/26* (2006.01)
(Continued)

(52) U.S. Cl.
CPC ............. *B21D 53/88* (2013.01); *B21D 22/20* (2013.01); *B21D 22/26* (2013.01); *B21D 24/04* (2013.01);
(Continued)

(58) Field of Classification Search
None
See application file for complete search history.

(56) References Cited

FOREIGN PATENT DOCUMENTS

| JP | 63-133821 | 9/1988 |
|----|-----------|--------|
| JP | 3-57423 | 6/1991 |

(Continued)

OTHER PUBLICATIONS

JP2009-061473, Uematsu K., English machine translation from EPO dated Jun. 12, 2016.*

(Continued)

*Primary Examiner* — Adam Krupicka
(74) *Attorney, Agent, or Firm* — Clark & Brody

(57) ABSTRACT

A press-formed product includes a body having a transverse cross section including a bottom portion and a shoulder portion contiguous to the bottom portion through an R end. In the transverse cross section, a first region from the R end to a position a distance away in a bottom portion extending direction, and a second region which is part of the bottom portion and is contiguous to the first region have a work-hardening distribution introduced by press-forming. The work-hardening distribution has an average hardness Hv1 of an area of the first region from a steel sheet surface to a depth obtained by multiplying a steel sheet thickness by 0.2 and an average hardness Hv2 of an area of the second region from the steel sheet surface to a position obtained by multiplying the steel sheet thickness by 0.2 to satisfy a relationship of $Hv1 > 1.05 \times Hv2$.

2 Claims, 9 Drawing Sheets

(51) Int. Cl.
*B21D 24/04* (2006.01)
*B21D 22/20* (2006.01)
*B21D 24/06* (2006.01)
*B21K 1/76* (2006.01)
*B62D 29/00* (2006.01)
*B21D 22/10* (2006.01)

(52) U.S. Cl.
CPC ............... *B21D 24/06* (2013.01); *B21K 1/76* (2013.01); *B62D 29/007* (2013.01); *Y10T 428/1241* (2015.01)

(56) References Cited

FOREIGN PATENT DOCUMENTS

| | | |
|---|---|---|
| JP | 10-017933 | 1/1998 |
| JP | 2000-042635 | 2/2000 |
| JP | 3572950 | 7/2004 |
| JP | 2004-276031 | 10/2004 |
| JP | 4208044 | 10/2008 |
| JP | 2009-061473 | 3/2009 |
| JP | 2008-208149 | 9/2009 |
| JP | 2009-208149 | 9/2009 |
| JP | 2012-051005 | 3/2012 |

OTHER PUBLICATIONS

English Tanslation of JP63133821 by Phoenix Translations dated Nov. 2016.*

* cited by examiner

PRESS-FORMED PRODUCT

TECHNICAL FIELD

The present invention relates to a press-formed product.

BACKGROUND ART

High tensile strength steel sheets are often used as materials for component parts of automobile bodies for fuel efficiency enhancement for prevention of global warming and enhancement of safety in car collision. From among the automobile body components, strength parts such as side sills, side members and bumper reinforcements are required to have a high crashing load with respect to a three-point bending load. These strength parts generally have an elongated and a complex shape to prevent interference with other parts and secure spaces for disposing other parts.

The formability of a steel sheet decreases as the strength of the steel sheet increases. For example, when a high tensile strength steel sheet is used for an elongated press-formed product (for example, a side sill inner panel) having a hat-shaped cross section, which is manufactured by press forming, springback tends to occur because of the strength. The occurrence of springback in a press-formed product results in a failure and a reduction of yield in the subsequent manufacturing steps (for example, the welding step). Thus, there is a high demand for the suppression of springback of press-formed products using a high tensile strength steel sheet as a starting material.

FIG. 17 is an explanatory view schematically showing an example of a press forming apparatus 1 performing conventional bending. FIG. 18 is an explanatory view schematically showing springback occurring in shoulder portions 7c of a press-formed product 7.

As shown in FIGS. 17 and 18, the press forming apparatus 1 typically includes a punch 2, a die 3, and an upper pad 5 installed in such a manner that the upper pad 5 is embedded in the die 3 through a pressing member 4 so as to freely advance from, and retract into, the die 3. The pad may be installed as a lower pad in the punch 2, rather than installing the pad in the die 3 as the upper pad 5 like in the press forming apparatus 1 shown in FIG. 17.

A steel sheet 6 is bent and formed by the press forming apparatus 1 into a press-formed product 7 having a hat-shaped cross section. The bending is performed by making the upper pad 5 abut against a part of the press-formed product 7 that is to be formed into a bottom portion 7a before the forming, and then lowering the die 3 while maintaining the abutting as shown in FIG. 17. The bottom portion 7a of the press-formed product 7 is formed along a punch upper surface 2a of the punch 2. Wall portions 7b of the press-formed product 7 are formed along punch side surfaces 2b of the punch 2. Furthermore, curved-shouldered portions 7c of the press-formed product 7 that are contiguous to the bottom portion 7a and the respective wall portions 7b are formed along punch shoulder portions 2c of the punch 2.

Upon the steel sheet 6 being bent, tensile stress is generated on a front surface of the steel sheet 6 and compressive stress is generated on a back surface of the steel sheet 6. Accordingly, bending the shoulder portions 7c of the press-formed product 7 along the punch shoulder portions 2c consequently generates tensile stress on a front surface and compressive stress on a back surface. The generated tensile stress and compressive stress are released when the press-formed product 7 is released from the press forming apparatus 1. Consequently, springback occurs in the shoulder portions 7c of the press-formed product 7, whereby the press-formed product 7 has a shape in which the wall portions 7b spread outward as indicated by the circular arc-shaped arrows in FIG. 18, which is different from that of the die.

Patent Documents 1 to 4 each disclose a method for suppressing an amount of an angle variation (amount of springback) of a press-formed product using a lower pad of a press forming apparatus.

Patent Documents 5 and 6 disclose a method for enhancing crash performance of an automobile by quenching a part of a strength part of an automobile body by high frequency induction heating to be hardened and reinforced. Also, Patent Document 7 discloses a method for enhancing bending deformation performance of a hat-shaped strength part by reinforcing shoulder portions of the strength part by overlaying.

PRIOR ART DOCUMENTS

Patent Document

Patent Document 1: Japanese Patent Laid-Open No. 2000-042635
Patent Document 2: Japanese Patent No. 3572950
Patent Document 3: Japanese Utility Model Laid-Open No. 63-133821
Patent Document 4: Japanese Utility Model Laid-Open No. 3-057423
Patent Document 5: Japanese Patent Laid-Open No. 10-17933
Patent Document 6: Japanese Patent No. 4208044
Patent Document 7: Japanese Patent Laid-Open No. 2004-276031

SUMMARY OF INVENTION

Problem which the Invention is to Solve

None of the above mentioned Documents discloses an inexpensive press-formed product that can be used for a starting material of an shock absorbing member having a high crashing load with respect to a three-point bending load.

FIG. 19 schematically shows an example shape of a press-formed product 7 resulting from press-forming by a press forming apparatus disclosed in Patent Document 1 using a high tensile strength steel sheet 6 as a starting material. As shown in FIG. 19, during press forming, the high tensile strength steel sheet is formed along a punch upper surface 2a of a pad. In such case, a bottom portion 7a of the press-formed product 7 is formed so as to be bent with a large radius of curvature, resulting in a decrease in flatness of the bottom portion 7a, and thus, the press-formed product 7 is not formed into a desired shape. Therefore, when fabricating a punch 2 or a die 3 of a press forming apparatus 1 for press forming the high tensile strength steel sheet 6, it is necessary to form the punch 2 or the die 3 into an optimum shape for enabling the resulting press-formed product 7 to have a desired shape, and thus, it is necessary to make minor modifications (die adjustments) of the shape(s) of the punch 2 and/or the die 3 based on the shape of the press-formed product 7 obtained as a result of actually press forming the high tensile strength steel sheet 6 as a starting material through the trial and error process of. Consequently, since the man-hours and costs required for the adjustments of the punch 2 and/or the die 3 increase, it is impossible to inexpressively provide the press-formed product 7 using the high tensile strength steel sheet 6 as a starting material.

Furthermore, in mass production of press-formed products, if strength of each forming material of high tensile strength steel sheets are insufficiently controlled, a large number of press-formed products manufactured in mass production have dimensional fluctuation because variations in strength of the respective forming materials. Thus, none of the methods disclosed in Patent Documents 1 to 4 provides manufacturing high strength press-formed products with favorable dimensional accuracy in mass production.

Accordingly, in the methods disclosed in Patent Documents 1 to 4, if a material to be formed is a high-tensile strength steel sheet (particularly, if the material is a high tensile strength steel sheet with a tensile strength of at least 980 MPa, which has begun to be used as a starting material for strength parts of automobile bodies these days, more particularly, if the material is an ultrahigh tensile strength steel sheet with a tensile strength of at least 1180 MPa), springback cannot sufficiently be suppressed.

In the methods disclosed in Patent Documents 5 and 6, a strength part of an automobile body is partially quenched by high frequency induction heating. Thus, the dimensional accuracy of the strength part after the quenching decreases because amount of heat applied to the strength part inevitably increases, and the manufacturing costs for the strength part is increased because the quenching need to use high frequency induction heating.

Furthermore, the method disclosed in Patent Document 7 requires overlaying after press-forming, inevitably resulting in a decrease in dimensional accuracy and an increase in costs for manufacturing a strength part.

An objective of the present invention is to provide a press-formed product, for example, a press-formed product with a tensile strength of at least 980 MPa, which solves these problems of the prior art, and can inexpensively be manufactured only by press-forming without post-processing, for example, quenching using high frequency induction heating or overlaying, and can use the a high tensile strength steel sheet as a starting material of an shock absorbing member having a high crashing load with respect to a three-point bending load.

Means for Solving the Problem

Using "a press-forming apparatus including a die that supports a first pad abut against a surface of a high tensile strength steel sheet, which is a material to be worked, the high tensile strength steel sheet extending in one direction, in such a manner that the first pad can freely advance from, and retract into, the die in a direction of movement of the die, and a punch that stores a second pad abutting against another surface of the high tensile strength steel sheet in such a manner that the second pad can freely advance from, and retract into, the punch in a direction of closing, the high tensile strength steel sheet being held between the first pad on the upper side and the second pad on the lower side (hereinafter referred to as 'two pad-equipped press forming apparatus')", the present inventors performed crash-forming or drawing of high tensile strength steel sheets variously changing distance W in a direction parallel to a punch upper surface between a punch upper surface R end of each punch shoulder portion and the second pad in a vertical plane perpendicular to the one direction and stroke amount CSt of the second pad to study the impacts of springback on the press-formed products in detail.

As a result, the present inventors found that when the two pad-equipped press forming apparatus is used to form a high tensile strength steel sheet that is held between the first pad and the second pad until the completion of the forming of the high tensile strength steel sheet, by making a part of the punch upper surface between the punch upper surface R end of each punch shoulder portion and the second pad be not in contact with the steel sheet under formation during a period of time, deflection of the steel sheet is partially caused during forming, and subsequently, the shoulder portions and wall portions can be formed at a lower dead point of forming, so as to enable sufficient suppression of springback of the shoulder portions and manufacturing of a high-strength press-formed product with an acceptable bottom portion flatness and acceptable dimensional accuracy.

As the result of the present inventors' study on a press-formed product manufactured as described above, the present inventors found that:

(A) The press-formed product has a novel work hardening distribution that conventional press-formed products do not have, more specifically, the work hardening distribution indicated below, in a part of a bottom portion in the vicinity of each shoulder portion; and (B) Since the press-formed product has the novel work hardening distribution, the press-formed product is preferable as an inexpensive starting material for a shock-absorbing member having a high crashing load with respect to a three-point bending load, and thereby the present invention is completed.

The present invention provides a press-formed product of a steel sheet, the press-formed product including a body having a transverse cross section of a substantial channel shape, a substantial hat shape or a shape resulting from a combination of the substantial channel shape and the substantial hat shape, and extending in a direction, the transverse cross section including a bottom portion and a shoulder portion that is contiguous to the bottom portion through an R end, wherein a first region from the R end to a position a predetermined distance away in a direction in which the bottom portion extends, and a second region that is a part of the bottom portion and is contiguous to the first region in the transverse cross section have a work hardening distribution, which is described below, introduced by press-forming of the body.

The work hardening distribution is one in which average hardness Hv1 of the first region from a surface of the steel sheet to a position with a depth obtained by multiplying a thickness of the steel sheet by 0.2 and average hardness Hv2 of the second region from the surface of the steel sheet to the position with the depth obtained by multiplying the thickness of the steel sheet by 0.2 satisfies a relationship of $Hv1 > 1.05 \times Hv2$.

The "R end" in the present invention means a position of an end of a curve where the curve and a straight line are contiguous (a position of the boundary between the curve and the straight line).

In general, it is known that hardness measurement values in, e.g., Vickers hardness tests have a large margin of error caused by the specimens themselves and/or the measurement methods. However, the present inventors found that a credible hardness measurement result can be obtained by performing hardness measurement a plurality of times, for example, more than 10 times and calculating an average of the measurement values.

It is preferable that the predetermined distance in the press-formed product according to the present invention be 2 to 15 mm.

The press-formed product according to the present invention is manufactured using, for example, the below described press forming apparatus.

[Press Forming Apparatus]

The press forming apparatus is a press forming apparatus for manufacturing a press-formed product, the press forming apparatus including a die that supports a first pad abutting a surface of a steel sheet, which is a material to be worked, the steel sheet extending in one direction, in such a manner that the first pad can freely advance from, and retract into, the die in a direction of movement of the die, and a punch that stores a second pad abutting another surface of the steel sheet in such a manner that the second pad can freely advance from, and retract into, the punch in a direction of closing, the press-formed product having a transverse cross section including a bottom portion formed along a punch upper surface of the punch, a wall portion formed along a punch side surface of the punch, and a curved-shouldered portion formed along a punch shoulder portion of the punch, the curved shouldered portion being contiguous to the bottom portion and the wall portion.

In the press forming apparatus, pressure generated by a second pressing member supporting the second pad is larger than pressure generated by a first pressing member supporting the first pad. Furthermore, a punch upper surface R end of the punch shoulder portion and the second pad in a vertical plane perpendicular to the one direction exist at a predetermined distance (for example, 2 to 15 mm) from each other in a direction parallel to the punch upper surface.

The press-formed product according to the present invention is manufactured by, for example, the manufacturing method described below.

[Manufacturing Method]

The manufacturing method is a method for manufacturing a press-formed product by press forming a steel sheet using the press forming apparatus described above, the press-formed product having a transverse cross section including a bottom portion formed along a punch upper surface of a punch, a wall portion formed along a punch side surface of the punch, and a curved-shouldered portion formed along a punch shoulder portion of the punch, the curved-shouldered portion being contiguous to the bottom portion and the wall portion, the method including all of first to fourth steps in this order.

First step: A steel sheet is disposed and held between the first pad and the second pad. The steel sheet between the first pad and the second pad is held until the completion of forming of the steel sheet.

Second step: Forming of the steel sheet is started by bringing the die and the punch close to each other.

Third step: The forming of the steel sheet is performed, wherein a part of the punch upper surface between a punch upper surface R end of each punch shoulder portion and the second pad is made be not in contact with the steel sheet under formation during a period of time.

Fourth step: Shoulder portions and wall portions are formed at a lower dead point of forming after the third step.

Second pressure F2 generated by the second pressing member is preferably at least 0.4 kN/mm per unit width in the one direction, and first pressure F1 generated by the first pressing member is preferably at least 0.2 kN/mm per unit width in the one direction.

Furthermore, a stroke CSt of the second pad in the direction of closing is desirably 0.5 to 10 mm. If the stroke CSt is less than 0.5 mm, no sufficient suppression of springback may be achieved, and on the other hand, if the stroke CSt exceeds 10 mm, deflection of the steel sheet under formation becomes excessive, and the excessive deflection may remain in the resulting press-formed product.

These press-forming apparatus and manufacturing method achieve a sufficient springback suppression even in a case where a steel sheet to be formed has a strength of, for example, at least 980 MPa, furthermore, at least 1180 MPa. These press forming apparatus and manufacturing method reliably form a press-formed product into a desired shape including a desired flatness of the bottom portion. Accordingly, these press forming apparatus and manufacturing method enable significant reduction in man-hour and time required for minor modifications (die adjustments) of the shape(s) of the punch and/or the die.

Effects of Invention

The press-formed product according to the present invention has the work-hardening distribution indicated above that conventional press-formed products do not have and is provided by press-working, in the parts of the bottom portion in the vicinity of each shoulder portion, and thus, is suitable for use as an inexpensive starting material for an shock-absorbing member having a high crashing load with respect to a three-point bending load.

The press-formed product according to the present invention achieves sufficient suppression of spring back of each shoulder portion and an acceptable flatness of the bottom portion even if the steel sheet that is a starting material of the press-formed product is, for example, a high tensile strength steel sheet with a tensile strength of at least 980 MPa.

Therefore, the press-formed product according to the present invention greatly contributes to automobile safety enhancement and fuel efficiency enhancement provided by automobile body weight reduction.

DESCRIPTION OF EMBODIMENTS

The following description is provided taking a case where a steel sheet that is a material to be worked is a high tensile strength steel sheet with a tensile strength of at least 980 MPa as an example.

1. Press Forming Apparatus

FIG. 1A is an explanatory view schematically showing a configuration of a press-forming apparatus 10 for crash-forming, and FIG. 1B is a partially enlarged view of FIG. 1A. FIG. 2 is an explanatory view schematically showing a configuration of a press forming apparatus 10-1 for drawing.

Figure 1:
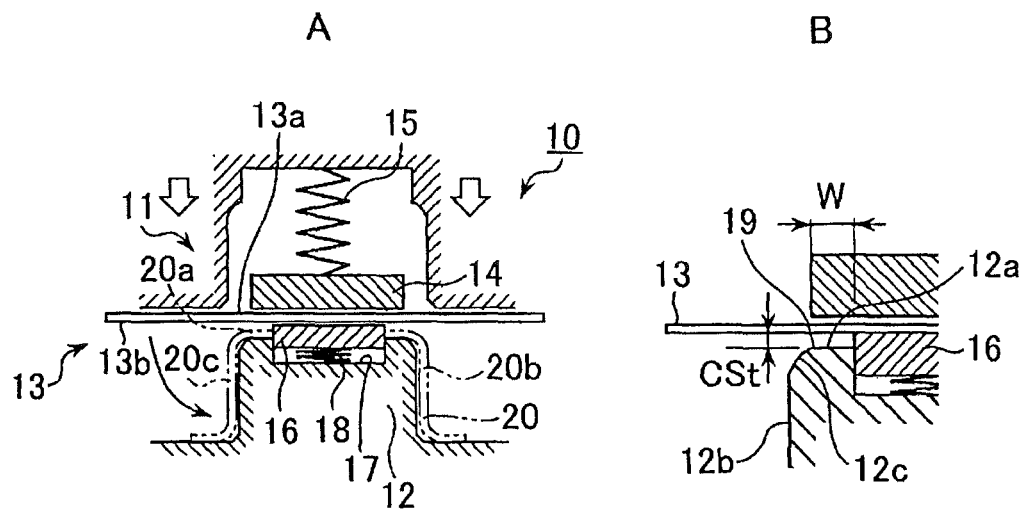
FIG. 1A is an explanatory view schematically showing a configuration of a press forming apparatus for crash-forming.
FIG. 1B is a partially enlarged view of FIG. 1A.
Figure 2:
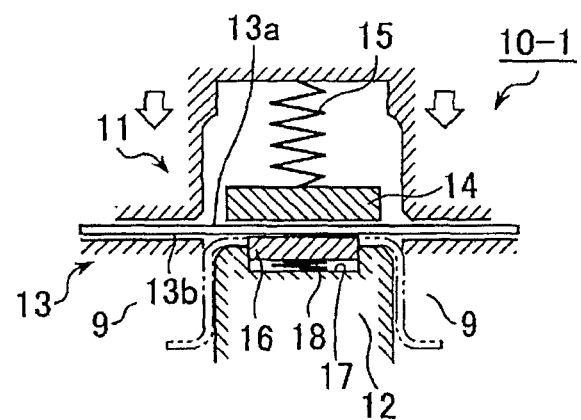
FIG. 2 is an explanatory view schematically showing a configuration of a press forming apparatus for drawing.

A press forming apparatus according to the present invention is applicable to crash forming such as shown in FIGS. 1A and 1B, but to drawing such as shown in FIG. 2. Since the press forming apparatuses 10 and 10-1 are each other different only in terms of whether or not blank holders 9 for drawing are provided, the following description will be provided using the press forming apparatus 10, and description of the press forming apparatus 10-1 that overlaps that of the press forming apparatus 10 will be omitted by providing the same elements as those of the press forming apparatus 10 with the same reference numerals as those in FIG. 1, in FIG. 2.

The press forming apparatus 10 comprises a die 11 and a punch 12. The press forming apparatus 10 performs press-forming of an elongated steel sheet 13 extending in one direction (direction perpendicular to the sheet of FIG. 1A).

The die 11 supports a first pad 14 so that the first pad 14 can freely advance from, and retract into, the die 11 in a direction of movement of the die 11. The first pad 14 is supported by a first pressing member 15 attached to the first pad 14 (a helical spring is used in the press forming apparatus 10, but the first pressing member 15 is not limited to this). The first pressing member 15 presses the first pad 14 against the steel sheet 13 with pressure (spring force) F1. Consequently, the first pad 14 is made abut against one surface 13a of the steel sheet 13.

The punch 12 stores a second pad 16 so that the second pad 16 can freely advance from, and retract into, a storage portion 17 formed in a concave shape in the punch 12 in a direction of closing (which is the same as the direction of movement of the die 11). The second pad 16 is supported by a second pressing member 18 (a helical spring is used in the press forming apparatus 10) attached to a bottom portion of the storage portion 17. The second pressing member 18 presses the second pad 16 against the steel sheet 13 with pressure (spring force) F2. Consequently, the second pad 16 is made abut against another surface 13b of the steel sheet 13.

As shown in FIG. 1B, distance W in a direction parallel to a punch upper surface 12a between a punch upper surface R end 19 of each punch shoulder portion 12c and the second pad 16 in a vertical plane perpendicular to the one direction, which is a direction in which the steel sheet 13 extends, is desirably at least 2 mm and at most 15 mm.

Figure 4:
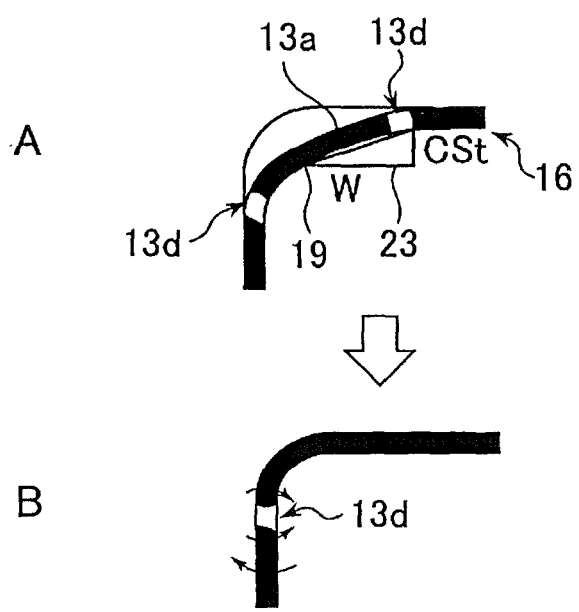
FIG. 4A is an explanatory view schematically showing how a steel sheet is formed in a third step.
FIG. 4B is an explanatory view schematically showing how the steel sheet is formed in a fourth step.

If the distance W exceeds 15 mm, a failure may occur in shape of a bottom portion of a press-formed product 20, and as described later with reference to FIG. 4, length L of an extra length part 13a of the steel sheet 13 (hereinafter referred to as "the extra length part") becomes long, which may result in a need to set necessary stroke CSt of the second pad 16 to be large. On the other hand, if the distance W is less than 2 mm, each punch shoulder portion 12b of the punch 12 is insufficient in strength, which may cause the punch 12 to be damaged by pressure applied at a lower dead point of forming. Thus, it is desirable that the distance W be at least 2 mm and at most 15 mm. Based on respective experimental values, a lower limit value of the distance W is more desirably 3 mm, and still more desirably, 5 mm. An upper limit value of the distance W is more desirably 13 mm, and still more desirably, 10 mm.

If the pressure F1 of the first pad 14 is excessively high, the second pad 16 makes a downward stroke during forming, which may result in impossibility to obtain a shape-accuracy. Thus, the pressure F2 generated by the second pressing member 18 supporting the second pad 16 needs to be larger than the pressure F1 generated by the first pressing member 15 supporting the first pad 14. In other words, F2−F1>0. It is desirable that (F2−F1)/F1>1.2, and it is more desirable that (F2−F1)/F1>2.

The second pressure F2 is desirably at least 0.4 kN/mm per unit width in one direction, and the first pressure F1 is desirably is at least 0.2 kN/mm per unit width in the one direction. Furthermore, a stroke CSt of the second pad 16 in the direction of closing is desirably 0.5 to 10 mm. If the stroke CSt is less than 0.5 mm, springback cannot be suppressed sufficiently, and on the other hand, if the stroke CSt exceeds 10 mm, deflection of the steel sheet 13 under formation becomes excessive, and there is a risk that the excessive deflection will remain in the resulting press-formed product.

As shown in FIG. 1A, the steel sheet 13 is press formed by the die 11 and the punch 12 into the press-formed product 20 having a transverse cross section including a bottom portion 20a, wall portions 20b, and shoulder portions 20c that are contiguous to the bottom portion 20a and the respective wall portions 20b.

The bottom portion 20a is formed along the punch upper surface 12a of the punch 12. Each wall portion 20b is formed along the corresponding punch side surface 12b of the punch 12. Furthermore, each shoulder portion 20c is formed along the corresponding punch shoulder portion 12c of the punch 12.

Figure 3:
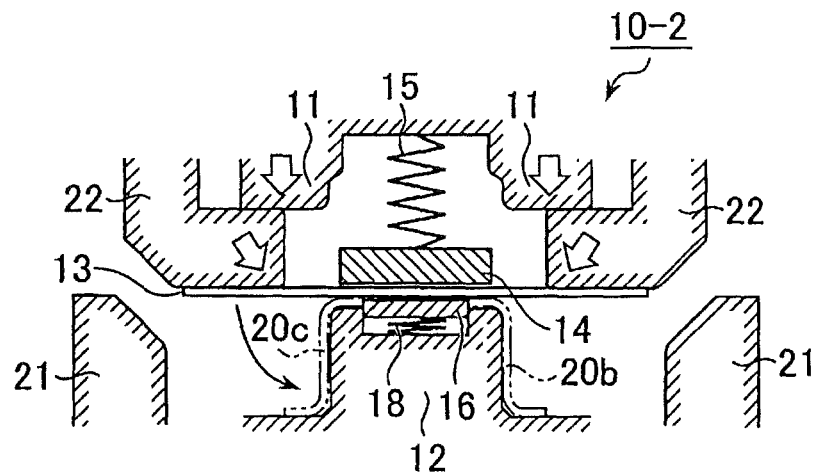
FIG. 3 is an explanatory view schematically showing a configuration of a cam mechanism-equipped press forming apparatus for crash-forming.

FIG. 3 is an explanatory view schematically showing a configuration of a cam mechanism-equipped press forming apparatus 10-2 for crash forming. In FIG. 3, also, description of the press forming apparatus 10-2 that overlaps that of the press forming apparatus 10 will be omitted by providing the same elements as those of the press forming apparatus 10 with the same reference numerals as those in FIG. 1.

As shown in FIG. 3, as a result of a cam mechanism 21 being incorporated in a die 11 and a punch 12, when each of movable dies 22 moves toward a lower dead point of forming, as indicated in the arrow, side wall portions diagonally come close to the punch 12. Consequently, in addition of suppression of springback of shoulder portions 20c, warp of wall portions 20b is also suppressed. A mechanism that diagonally drives the movable dies 22 is not limited to the cam mechanism 21, and may be, for example, a hydraulic cylinder for diagonal driving, which is incorporated in a press forming apparatus separately from a main slide of the press forming apparatus.

Each of the press forming apparatuses 10, 10-1 and 10-2 may be a hydraulic press machine, a mechanical press machine or a mechanical servo press machine. Use of a servo press machine, which has a high operating accuracy, is desirable because a cushion stroke can be provided with high accuracy.

The above description has been based on an example where helical springs are used as the first pressing member 15 and the second pressing member 18. However, each of the first pressing member 15 and the second pressing member 18 is not limited to a spring such as a helical spring, and may be a reaction force generation mechanism such as a gas-filled hydraulic cylinder, but is desirably a reaction force generation mechanism that generates an initial reaction force.

A cylinder connected to a hydraulic power source or a pneumatic power source, a motor-driven electric cylinder or the like is used as the second pressing member 18 supporting the second pad 16, by which the second pad 16 can be operated independently.

2. Method for Manufacturing a Press-Formed Product

A method for press forming a steel sheet 13 using the above-described press forming apparatus 10 will be described. By the manufacturing method, a press-formed product 20 having a transverse cross section including a bottom portion 20a, wall portions 20b and shoulder portions 20c, which has been described above, is manufactured. The manufacturing method includes the following first to fourth steps, which are executed basically in this order from the first step.

In the first step, the steel sheet 13 is disposed and held between a first pad 14 and a second pad 16. The holding is maintained until the completion of forming of the steel sheet 13. More specifically, a part that is formed into the bottom portion 20a of the press-formed product 20 is held between the first pad 14 and the second pad 16 until the completion of the forming. Consequently, even if the steel sheet 13 is a high tensile strength steel sheet, a deterioration of flatness of the bottom portion 20a is prevented.

In the second step, the die 11 is lowered so that the steel sheet 13 is disposed between the die 11 and the punch 12, whereby forming of the steel sheet 13 is started.

FIG. 4A is an explanatory view schematically showing how the steel sheet 13 is formed in the third step, and FIG. 4B is an explanatory view schematically showing a state of forming of the steel sheet 13 in the fourth step.

In the third step, in continuity with the second step, the die 11 is lowered, whereby a second pressure material 18 for the second pad 16 is pushed in until there is no stroke of the second pressure material 18 any longer. Here, as shown in FIG. 4A, a part 23 of a punch upper surface 12a between a punch upper surface R end 19 of each punch shoulder portion 12c and the second pad 16 is not in contact with the steel sheet 13 during formation.

A pressure F2 generated by a second pressing member 18 supporting the second pad 16 in the present invention is larger than a pressure F1 generated by the first pressing member 15 supporting the first pad 14. Even after lowering of the die 11 and forming of the steel sheet 13 start in the second step, the second pad 16 continues to protrude upward from the upper surface 12a of the punch 12. Thus, a part 23 of the punch upper surface 12a between the punch upper surface R end 19 of each punch shoulder portion 12c and the second pad 16 is not in contact with the steel sheet 13 even when the steel sheet 13 is being formed in the third step.

In this case, a part of the steel sheet 13 that exists in the vicinity of each part 23 of the punch upper surface 12a partially warps. In other words, in the third step, the second pad 16 has sufficient stroke amount CSt during forming, whereby an extra length part 13d is generated in the vicinity of each part to be formed as the corresponding shoulder portion 20c of the press-formed product 20.

The length L of each extra length part 13d is an R-line length (linear element with a curvature), and can be calculated by $L \approx \sqrt{(CSt^2+W^2)} - W$.

In the fourth step, pressure is applied in a state in which there is no stroke of the second pad 16. Consequently, as shown in FIG. 4B, the press-formed product 20 is formed at the lower dead point of forming, whereby the shoulder portions 20c and the wall portions 20b are formed. In the fourth step, the extra length parts 13d are pushed out, which countervails springback.

The press-formed product 20 is manufactured as described above.

FIG. 5A is an explanatory view schematically showing a result of a maximum principal stress distribution in a shoulder portion 20c of a press-formed product 20 at a lower dead point of forming when conventional press-forming was performed using a high tensile strength steel sheet (1.4 mm sheet thickness and 980 MPa class), which has been obtained by CAE analysis. FIG. 5B is an explanatory view schematically showing a result of a maximum principal stress distribution in a shoulder portion 20c of a press-formed product 20 at a lower dead point of forming when press forming was performed with CSt=3.5 mm using a high tensile strength steel sheet that is the same as above, by the manufacturing method according to the present invention, which was obtained by CAE analysis. In FIGS. 5A and 5B, symbol "+" in a circle denotes tensile stress, and symbol "−" in a circle denotes compressive stress.

As shown in FIG. 5A, at the lower dead point of forming by the conventional press forming, the part 20c to be formed into the punch shoulder portion 12c has compressive stress on the back side of the steel sheet 13 and tensile stress on the front side. Thus, springback occurs, which makes the shoulder portions 20c of the press-formed product 20 largely extend outward in a cross-section after removal from the die, resulting in occurrence of large springback in the entire cross-section of the press-formed product 20.

On the other hand, as shown in FIG. 5B, in the manufacturing method according to the present invention, in the fourth step, the extra length parts 13d of the length L that have been generated in the third step are crushed at the lower dead point of forming, whereby the extra length parts formed in the punch shoulder portions 12c of the punch 12 are pushed out toward the respective wall portions 20b. Then, the extra length parts 13d of the parts formed in the punch shoulder portions 12c are pushed toward the respective wall portions 20b and subjected to deformation by bending and bending back. Here, tensile stress and compressive stress are alternately generated on the front side and the back side of the steel sheet 13. Thus, the shoulder portions 20c of the press-formed product 20 after removal from the die spring-back inward in a cross-section by the stress balance. The springback toward the inside in the cross-section is countervailed by springback that makes the shoulder portions 20c extend outward. Thus, appropriate springback occurs in the entire cross-section of the press-formed product 20.

In the manufacturing method according to the present invention, in the fourth step, as shown in FIG. 5B, the stresses on the steel sheet 13 at the lower dead point of forming are countervailed, that is, balanced out in the direction of change due to springback. Accordingly, even if a tensile strength of the steel sheet 13 varies, the balanced state of stresses is maintained. Thus, in mass-production of press-formed products 20, even if there is tensile strength of respective steel sheets 13 varies because of insufficient control of strengths of respective forming materials including the steel sheets 13, press-formed products 20 with a springback amount suppressed acceptably can be mass-produced.

Here, in the fourth step, in order to ensure preventing the second pad 16 from lowering before reaching at the vicinity of the lower dead point of forming, it is effective that spring force (initial pressure) F2 of the helical spring, which is the second pressing member 18 supporting the second pad 16, is sufficiently high, and it is desirable that the spring force F2 be, for example, at least 0.4 kN/mm per unit width in a longitudinal direction of the press-formed product 20.

Also, in the fourth step, weak holding of the steel sheet 13 by the first pad 14 makes the part of the steel sheet 13 that is formed into the bottom portion 20a of the press-formed product 20 float up, and thus, it is effective that pressure (initial pressure) of the first pad 14 is sufficiently high, and it is desirable that the pressure be, for example, at least 0.2 kN/mm per unit width in the longitudinal direction of the press-formed product 20.

Figure 6:
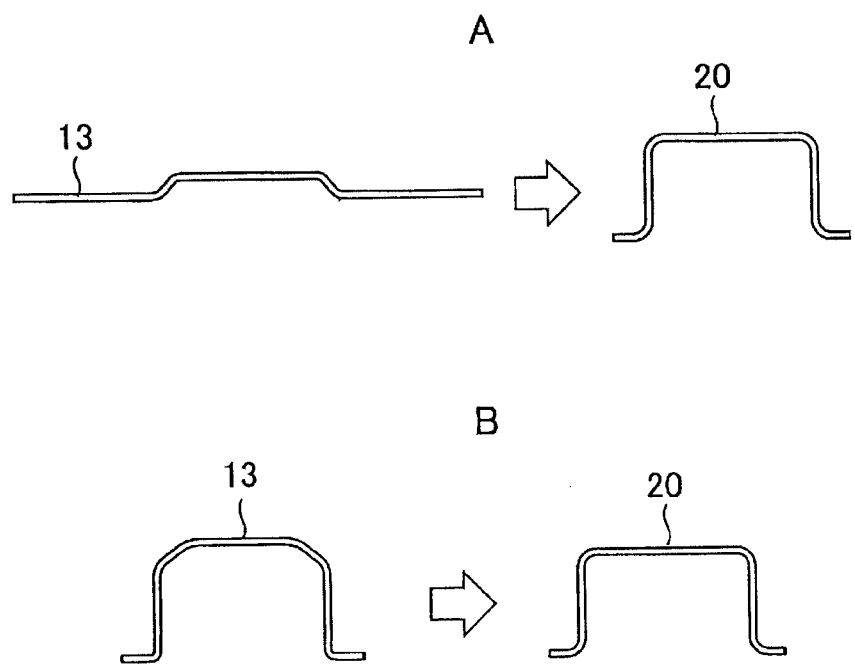
FIG. 6A is an explanatory view schematically showing how a press-formed product according to the present invention is formed in two steps.
FIG. 6B is an explanatory view illustrating another method for producing a press-formed product according to the present invention.

FIG. 6A is an explanatory view schematically showing a method of forming a press-formed product 20 in two steps.

Figure 5:
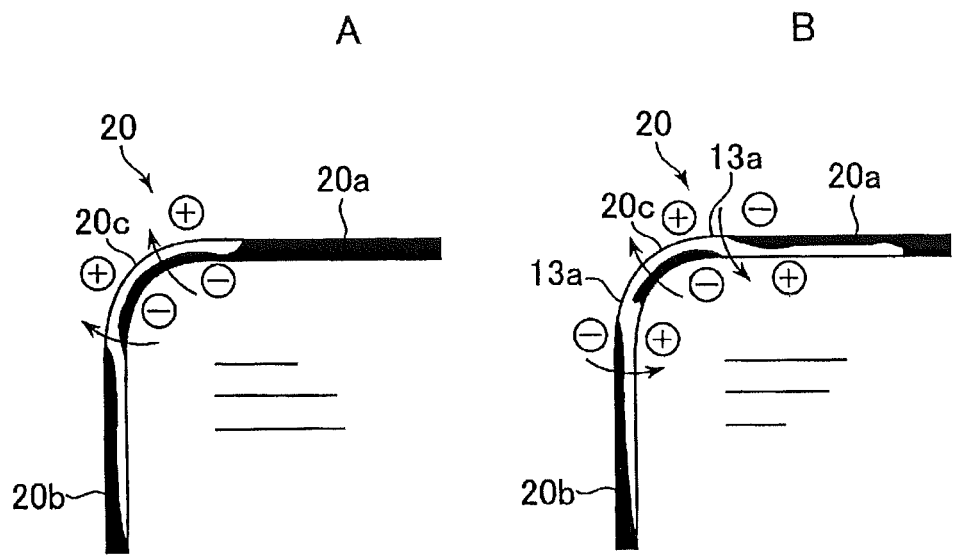
FIG. 5A is an explanatory view schematically showing a result of a maximum principal stress distribution in a shoulder portion of a press-formed product at a lower dead point of forming in conventional press forming, which is obtained by means of CAE analysis.
FIG. 5B is an explanatory view schematically illustrating a result of a maximum principal stress distribution in a shoulder portion of a press-formed product at a lower dead point of forming in press-forming (CSt=3.5 mm), which is obtained by means of CAE analysis.

Although the method for forming a steel sheet 13 in a series of steps has been described with reference to FIGS. 4 and 5, by contrast with the method, a press-formed product 20 may be manufactured by forming the steel sheet 13 in two steps, that is, subjecting the steel sheet 13 to shallow drawing in a shallow drawing step, and then to crash forming in a bending step as shown in FIG. 6A.

Each of FIGS. 7A to 7H is an explanatory view showing an example transverse cross-sectional shape of a press-formed product 20.

Figure 7:
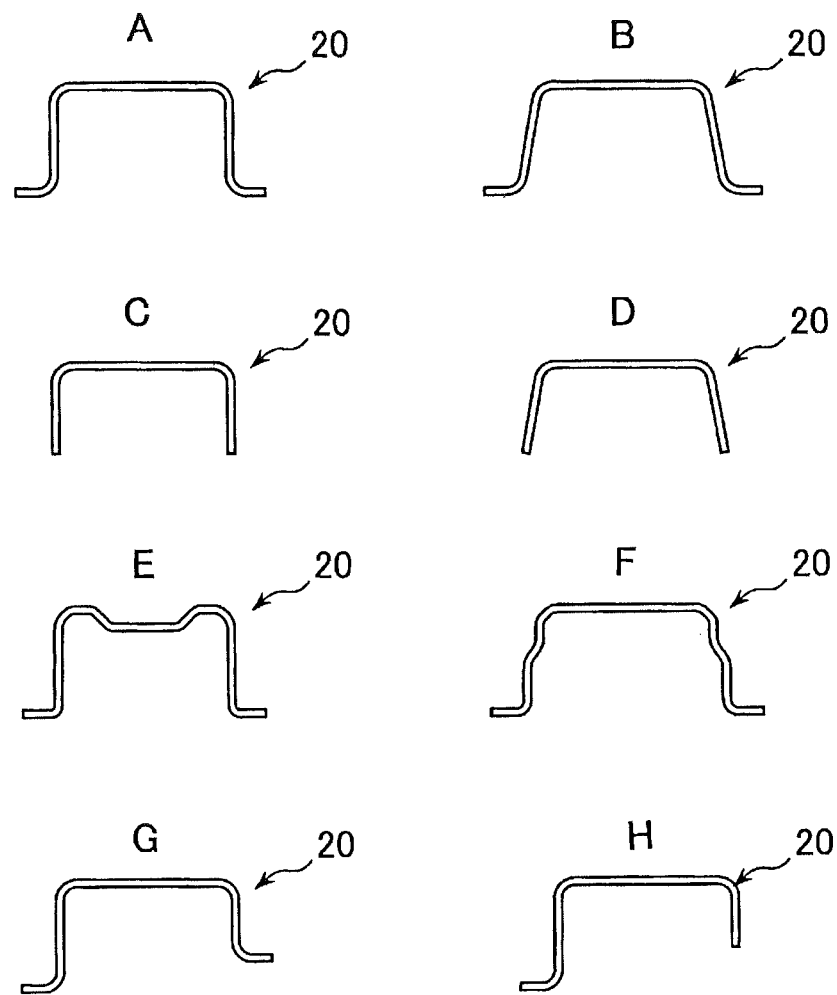
FIGS. 7A-7H are explanatory view schematically s each showing an example transverse cross-sectional shape of a press-formed product according to the present invention.

A press-formed product 20 may have a substantial hat shape cross-section such as a hat-shaped cross section shown in FIG. 7A, a diagonal-wall hat-shaped cross section shown in FIG. 7B, a hat-shaped cross section with a bottom portion shape shown in FIG. 7E or a hat-shaped cross-section with a stepped vertical wall portion shown in FIG. 7F. A press-formed product 20 may have a substantial channel-shaped cross section such as a channel-shaped cross section shown in FIG. 7C or a diagonal-wall channel-shaped cross section shown in FIG. 7D. Also, a press-formed product 20 may have a hat-shaped cross-section with left and right wall portions having different heights, which is shown in FIG. 7G, or a transverse cross section having a combination of a substantial hat shape cross-section and a substantial channel shape cross-section, which is shown in FIG. 7H.

In other words, a press-formed product 20 may have vertical wall portions each having an inclination as shown in FIGS. 7B and 7D, or may have left and right wall portions having different heights as shown in FIGS. 7G and 7H.

Figure 8:
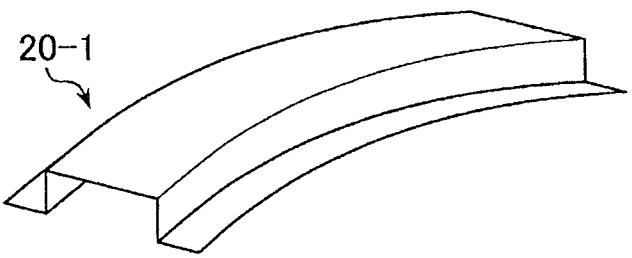
FIG. 8 is an explanatory view showing an example shape of a press-formed product according the present invention.

FIG. 8 is an explanatory view showing an example shape of a press-formed product 20-1.

The press-formed product 20-1 may have a curvature in one or both of vertical and horizontal directions relative to a longitudinal direction of the strength part (direction perpendicular to a cross-section).

FIG. 6B is an explanatory view schematically showing another method for manufacturing a press-formed product 20, and is an explanatory view schematically showing a two-step forming method.

As shown in FIG. 6B, the press-formed product 20 can be manufactured in two steps resulting from simply dividing the above-described manufacturing steps into two steps, without using the manufacturing method described above.

As described above, by the manufacturing method according to the present invention, even if a steel sheet, which is a starting material, is a high tensile strength steel sheet, for example, at least 980 MPa, springback in shoulder portions can be sufficiently suppressed and a press-formed product including a bottom portion with an acceptable flatness can be obtained. Also, as described below, a press-formed product manufactured by the manufacturing method according to the present invention has a work-hardening distribution that conventional press-formed products do not have, in a part of a bottom portion in the vicinity of each shoulder portion, and has a high crashing load with respect to a three-point bending load.

3. Press-Formed Product 20 According to the Present Invention

Figure 9:
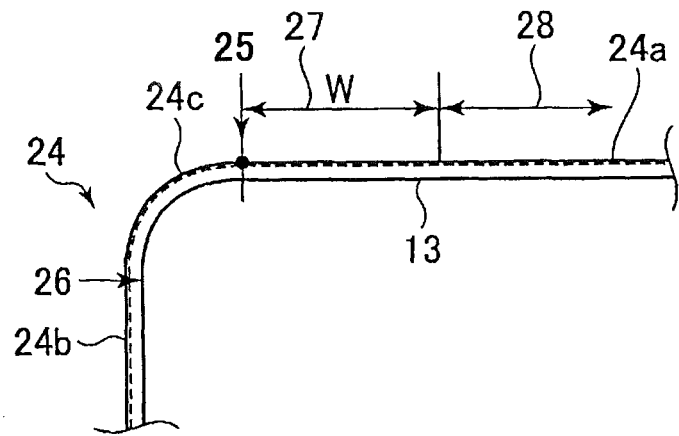
FIG. 9 is an explanatory view showing a part of a transverse cross section of a press-formed product according to the present invention.

FIG. 9 is an explanatory view showing a part of a transverse cross section of a body 24 of a press-formed product 20.

As shown in FIG. 9, the press-formed product 20 is obtained by subjecting a steel sheet 13 to press-forming according to the above-described manufacturing method. The press-formed product 20 has the body 24. The body 24 may have a transverse cross section of a substantial channel shape, a substantial hat shape or a combination thereof. The body 24 extends in one direction (direction substantially perpendicular to the sheet of FIG. 9).

The transverse cross section of the body 24 includes a bottom portion 24a, shoulder portions 24c and wall portions 24b. Each shoulder portion 24c is contiguous to the bottom portion 24a through one R end 25 and is contiguous to the corresponding wall portion 24b through another R end 26.

The body 24 includes a first region 27 and a second region 28. In the transverse cross section shown in FIG. 9, the first region 27 is a region from the one R end 25 to a position predetermined distance W (mm) away in a direction in which the bottom portion 24a extends. Also, the second region 28 is a region that is a part of the bottom portion 24a and is contiguous to the first region 27.

The distance W (mm) indicated in FIG. 9 is distance W in the direction parallel to a punch upper surface 12a between a punch upper surface R end 19 of a punch shoulder portion 12c and a second pad 16 in the vertical plane perpendicular to one direction that is a direction in which the steel sheet 13 extends, as in FIG. 1B. Thus, the distance W is desirably at least 2 mm and at most 15 mm.

The first region 27 and the second region 28 have a work-hardening distribution satisfying the relationship of Hv1>1.05×Hv2, which is caused by press-forming of the body 24. Hv1 is an average hardness of an area of the first region 27 from a surface of the steel sheet 13 to a position of a depth (0.2 t) obtained by multiplying thickness t of the steel sheet 13 by 0.2. Hv2 is an average hardness of an area of the second region 28 from a surface of the steel sheet 13 to the position of the depth (0.2 t) obtained by multiplying the thickness t of the steel sheet 13 by 0.2.

In other words, the average hardness Hv1 in the area in the aforementioned depth of the first region 27 is higher than the average hardness Hv2 of the area in the depth of the second region 28 by more than 5%.

Each of the average hardnesses Hv1 and Hv2 may be, for example, a Vickers hardness, and for example, an average value of measurements of at least 10 points by a measurement method specified in JIS Z2244 is used. At least 10 measurement positions for the average hardness Hv1 may be selected such that the measurement positions are spaced substantially equally in a circumferential direction in the first region 27. Measurement positions for the average hardness Hv2 may be selected such that the measurement positions are spaced substantially equally in a cross section of 5 mm inside (side opposite to the shoulder portion 24c) from a position at least 3 mm away from a boundary between the first region 27 and the second region 28. If a flatness of the bottom portion 24a is higher, the measurement positions may be selected such that the measurement positions are spaced substantially equally in a cross section of 10 mm inside from the position at least 3 mm away. A reason for selecting the position at least 3 mm away from the boundary between the first region 27 and the second region 28 is that a hardness of a part of the region 28 that is close to the boundary between the first region 27 and the second region 28 may be increased by the influence of work hardening during the working.

Since the first region 27 and the second region 28 each have such work-hardening distribution, an shock-absorbing member used as a starting material for the press-formed product 20 has a high crashing load with respect to a three-point bending load. A reason for this will be described. Here, the "three-point bending load" may be one in the case of, for example, a press-worked member such as shown in FIG. 8, where a load is applied to a side surface of a center portion of the press-worked member with opposite ends in a longitudinal direction fixed, but is not limited to such case and may be any of three-point bending loads known in the relevant technical field.

In general, it is known that when a three-point bending load is applied to a member having a transverse cross section of a substantial channel shape or a substantial hat shape by an shock load applied from a bottom portion thereof, buckling of the member with reduced deformation in the transverse cross section during bending is effective for obtaining a high bending deformation resistance. This is because when a transverse cross section of a member starts deformation, that is, a bottom portion and two wall portions that are contiguous to the bottom portion start collapsing, no stress is generated in a longitudinal direction of the member. Accordingly, increasing a plastic deformation amount in the longitudinal direction of the member, in other words, stretching the member in the longitudinal direction, is effective for exhibiting a high crashing load with respect to a three-point bending load. Conversely, if the bottom portion and the two wall portions collapse early during deformation due to a three-point bending load, the member is not stretched in the longitudinal direction, making it impossible to obtain a high crushing load.

As known well, enhancing a strength, that is, a hardness of shoulder portions connecting a bottom portion and respective wall portions and regions in the vicinity of the shoulder portions prevents early collapse of the bottom portion and the two wall portions that are contiguous to the bottom portion because of deformation due to a three-point bending load, and thus effective for stretching the member in the longitudinal direction.

As described above, the press-formed product 20 has a work-hardening distribution in which the average hardness Hv1 of the first region 27 adjacent to the shoulder portion 24c of the body 24 satisfies a relationship of Hv1>1.05×Hv2 relative to the average hardness Hv2 of the second region 28, which is provided by press-forming. Thus, an shock-absorbing member formed using the press-formed product 20 as a starting material thereof can prevent early collapse of the bottom portion 24a and the wall portions 24b by deformation due to a three-point bending load and can make the body 24 stretch in the longitudinal direction, and thus has a high crashing load with respect to a three-point bending load.

From such viewpoint as described above, the first region 27 and the second region 28 desirably satisfy a relationship of Hv1≥1.07×Hv2, and more desirably satisfy a relationship of Hv1≥1.10×Hv2.

EXAMPLE 1

The present invention will be described in more detail with reference to an example.

In the example, an effect of press forming of a press-formed product 20 according to the present invention using the press forming apparatus 10-2 shown in FIG. 3 was verified. The punch 12 of the press forming apparatus 10-2 had a width of 80 mm, a height of 60 mm and the press forming apparatus 10-2 had a depth of 80 mm.

Figure 10:
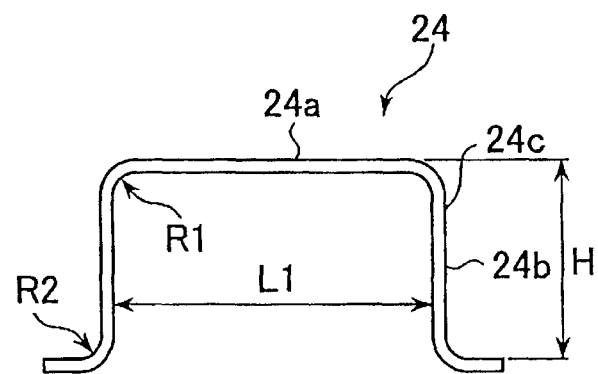
FIG. 10 is an explanatory view schematically showing a transverse cross-sectional shape of a press-formed product that is to be examined in an example.

FIG. 10 is an illustrative diagram showing a transverse cross-sectional shape of a body 24 of a press-formed product 20, which is a target for verification in the example.

Curvature radius R1 of a portion of an inner surface of each shoulder portion 24c that corresponds to a punch shoulder was 5 mm. Curvature radius R2 of a flange portion of the body 24 that corresponds to a die shoulder was 3.6 mm. Internal dimension L1 and height H of the body 24 were 80 mm and 50 mm, respectively.

Then, press forming was performed under the test conditions indicated below.
(Test Conditions)
(a) Press equipment: 2500-kN hydraulic press machine
(b) Material to be worked: 980 MPa-class high tensile strength steel sheet 13 (with a thickness of 1.4 mm, for confirmation of stroke CSt), and 590 MPa-, 780 MPa-, 980 MPa-, and 1180 MPa-class high tensile strength steel sheets (with a thickness of 1.4 mm, for confirmation of the effect of reduction of steel sheet strength variation)
(c) Blank shape: Rectangular shape of 70×200 mm
(d) Forming rate: 10 mm/sec (e) Length W: Four levels of 5, 10, 15 and 20 mm (with 15 mm as the standard condition)
(f) Pressure of second pad 16: 200 kN
(g) Pressure of first pad 14: 40 kN
(h) Lower dead point pressure: 700 kN
(i) Lubrication: Secured by applying a generally-used anti-corrosion oil to the steel sheet 13

Springback of the resulting body 24 and deflection of the shoulder portions 24c were measured and evaluated by the below-described evaluation method.

(Springback)

Figure 11:
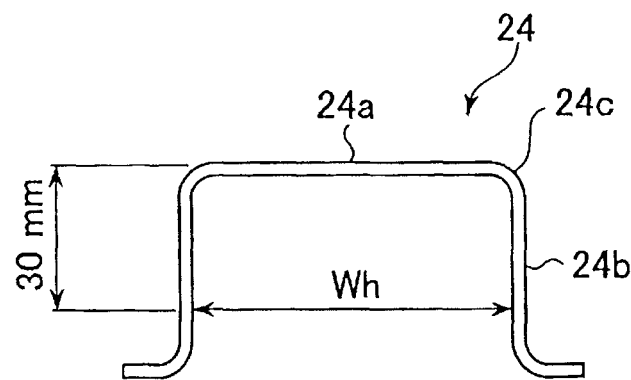
FIG. 11 is an explanatory view showing a method for evaluating springback of a press-formed product.

FIG. 11 is an explanatory view showing a method for evaluating springback of a body 24.

As shown in FIG. 11, springback was evaluated by measuring opening amount Wh (mm) at a position 30 mm away from a bottom portion 24a of the body 24 in a direction in which wall portions 24b extend.

(Deflection of Shoulder Portions 24c)

Figure 12:
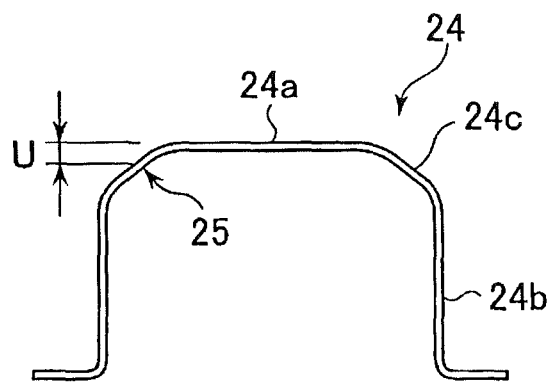
FIG. 12 is an explanatory view showing a method for evaluating deflection of a shoulder portion.

FIG. 12 is an explanatory view showing a method for evaluating deflection of a shoulder portion 24c.

As shown in FIG. 12, deflection of a shoulder portion 24c was evaluated by measuring deflection U (mm), which is a distance between the bottom portion 24a and an R end 25 in a direction in which the wall portions 24b extend.

Figure 13:
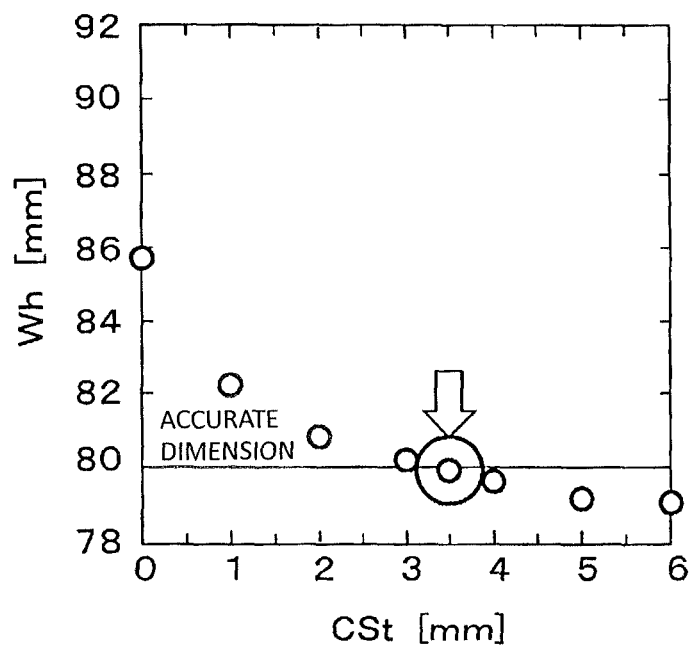
FIG. 13 is a graph indicating a relationship between stroke amount CSt of a second pad and opening amount Wh.

FIG. 13 is a graph indicating results of measurements of a relationship between stroke amount CSt of a second pad 16 and opening amount Wh. The graph in FIG. 13 indicates results of measurements of a 980 MPa-class high tensile strength steel sheet 13 with a thickness of 1.4 mm. The graph in FIG. 13 indicates that as the opening amount Wh is larger, springback is stronger.

As indicated in the graph in FIG. 13, from the results of tests with a variation of stroke amounts CSt under the condition that distance W is 10 mm, it can be seen that appropriate opening amount Wh can be obtained by changing the stroke amount CSt.

Figure 14:
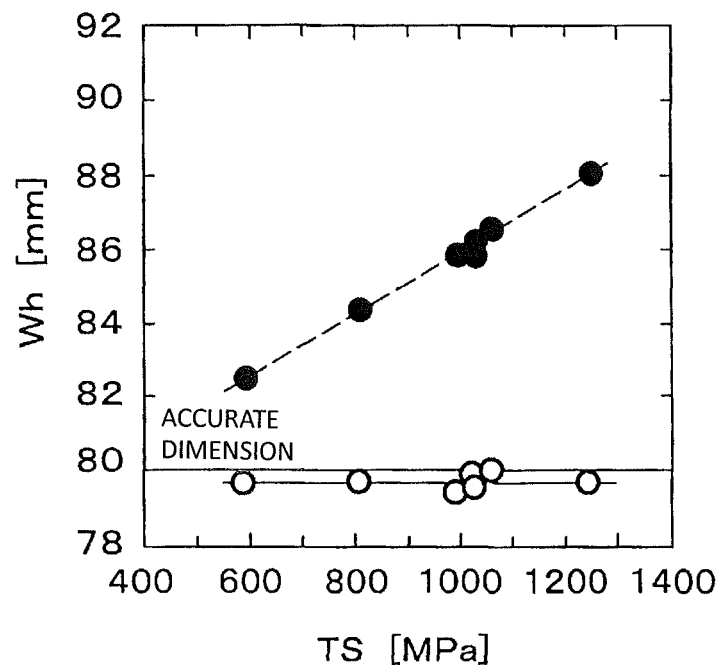
FIG. 14 is a graph indicating a relationship between tensile strength of a steel sheet and the opening amount Wh.

FIG. 14 is a graph indicating results of measurements of a relationship between tensile strength TS of the steel sheet 13 and opening amount Wh. Filled circles in the graph in FIG. 14 each denote a result of forming using the conventional press forming apparatus 1 shown in FIG. 17, and the open circles each denote a result of forming using the press forming apparatus 10-2 shown in FIG. 3. The graph in FIG. 14 also indicates that as the opening amount Wh is larger, the springback is stronger. The results indicated in FIG. 14 are results of forming each of the high tensile strength steel sheets 13 with a tensile strength of 590 to 1180 MPa and with the stroke amount CSt of the second pad 16 as an appropriate value (3.5 mm) for 980 MPa-class high tensile strength steel sheets 13, which is indicated by the circle-affixed arrow in the graph in FIG. 13.

Comparing the filled circles and the open circles in the graph in FIG. 14, it can be seen that even through the tensile strength of the steel sheet 13 varies, substantially appropriate opening amount Wh can be maintained by forming using the press forming apparatus 10-2 shown in FIG. 3.

Furthermore, results of measuring deflection of a shoulder portion 20c of each of press-formed products manufactured by press forming a high tensile strength steel sheets 13 with a 980 MPa-class tensile strength with length W varied in four levels of 5, 10, 15 and 20 mm, using the press forming apparatus 10-2 shown in FIG. 3 are collectively indicated in Table 1.

TABLE 1

| W | Deflection [mm] |
|---|---|
| 5 | 0.12 |
| 10 | 0.35 |
| 15 | 0.48 |
| 20 | 0.65 |

As indicated in Table 1, where the length W exceeds 15 mm and reaches 20 mm, the deflection of the shoulder portion 20c exceeds ±0.5 mm which is a common part accuracy tolerance.

Figure 15:
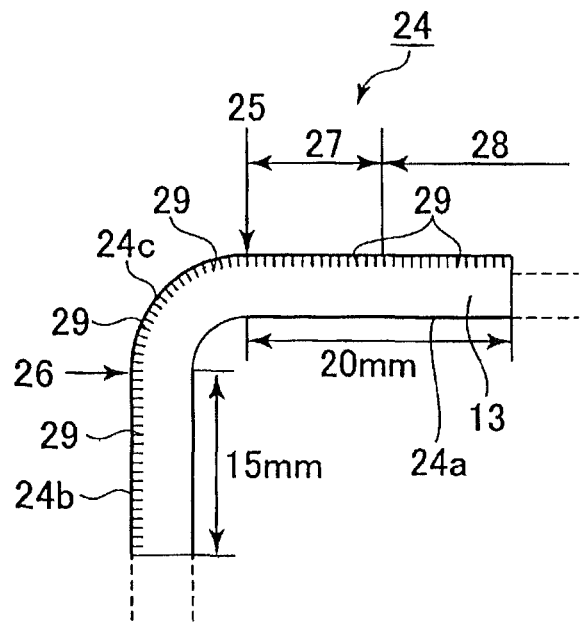
FIG. 15 is an explanatory view showing a bottom portion, a shoulder portion, and a first region and a second region in the vicinity thereof, of a press-formed product manufactured under the condition of W=10 mm.

FIG. 15 is an explanatory view showing a bottom portion 24a, a shoulder portion 24c and a first region 27 and a second region 28 in the vicinity of the shoulder portion 24c of a body 24 (thickness of steel sheet 13: 1.4 mm, a 980 MPa-class high tensile strength steel sheet) manufactured under the condition that the length W is 10 mm.

As shown in FIG. 15, Vickers hardnesses of the first region 27 and the second region 28 of the bottom portion 24a, and the shoulder portion 24c and the wall portion 24b were measured at a pitch of 1 mm in a direction of a periphery of a cross-section to obtain a work-hardening distribution. The Vickers hardness measurement was performed by a measurement method specified in JIS Z2244. Each measurement position 29 was set as a position with a depth of 200 μm from an area around an outer layer, that is, an outer surface of the steel sheet 13 in the thickness direction because work hardening of the body 24 is mainly attributable to bending and unbending deformation.

Figure 17:
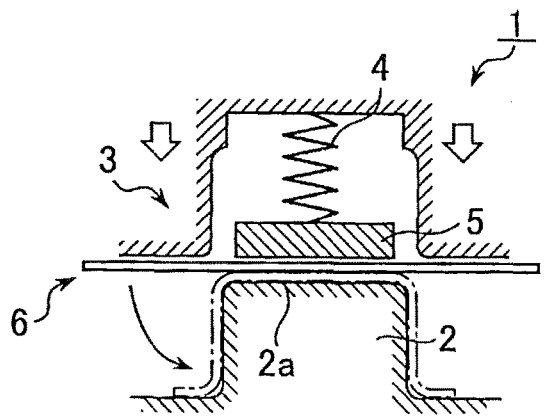
FIG. 17 is an explanatory view schematically showing an example structure of a press forming apparatus generally used.
Figure 18:
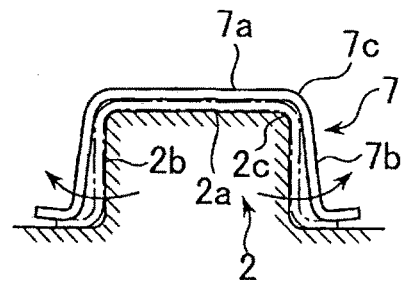
FIG. 18 is an explanatory view showing springback occurring in shoulder portions of a press-formed product.
Figure 19:
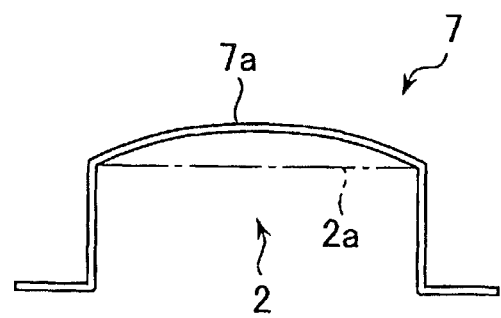
FIG. 19 is an explanatory view schematically showing an example shape of a press-formed product formed of a high tensile strength steel sheet using a press-forming apparatus disclosed in Patent Document 1.

As a conventional example, a press-formed product was manufactured under the same conditions as those for the body 24 of the press-formed product 20 shown in FIG. 15 except use of the press forming apparatus 1 illustrated FIG. 17. A work-hardening distribution in the press-formed product in the conventional example was measured by the above-described method.

Figure 16:
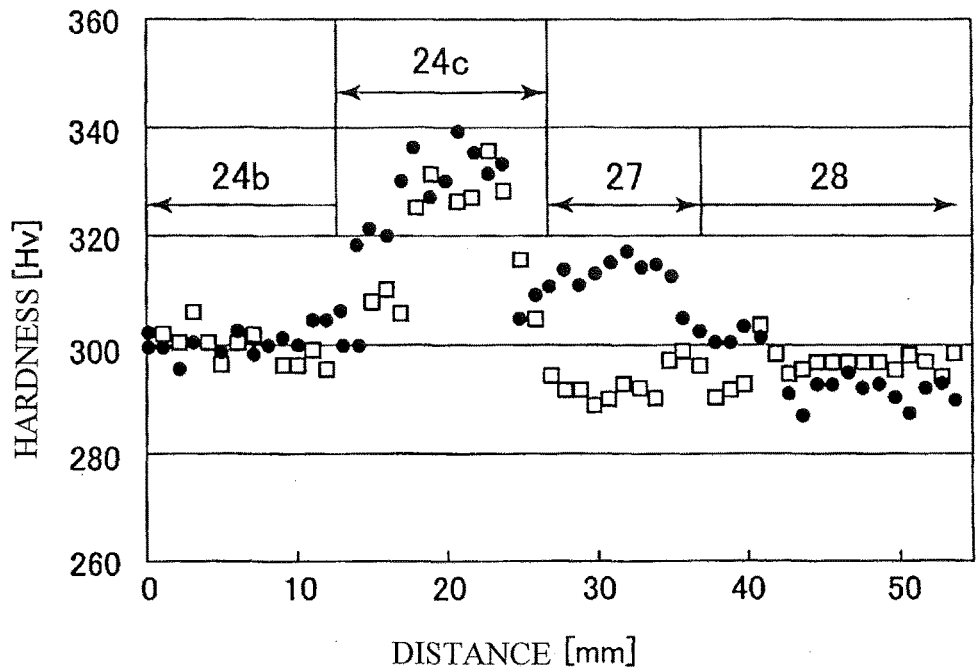
FIG. 16 is a graph indicating a work-hardening distribution of each of a press-formed product according to an inventive example of the present invention and a press-formed product according to a conventional example.

FIG. 16 is a graph indicating results of measurement of a work-hardening distribution of each of a press-formed product according to an inventive example of the present invention and the press-formed product according to the conventional example. The open squares in the graph in FIG. 16 denote results of measurement of the press-formed product according to the conventional example and the filled circles denote results of measurement of the inventive example of the present invention.

The work-hardening distribution of the press-formed product 20 according to the inventive example of the present invention was obtained by the above-described manufacturing method. More specifically, the steel sheet 13 is formed with the steel sheet 13 held between the second pad 16 protruding from the punch upper surface 12a of the punch 12 and the first pad 14, whereby during the forming in the third step, the extra length part 13d is generated in a part of the steel sheet 13 between the second pad 16 and each punch upper surface R end 19. The extra length parts 13d are depressed at a lower dead point of forming, and thereby flattened. Through the generation and evanescent of the extra length parts 13d, the extra length parts 13d are subjected to deformation by bending and bending back. The work-hardening distribution indicated by the filled circles in the graph in FIG. 16 is introduced to a surface of the first region 27 of the body 24 of the press-formed product 20 by the deformation by the bending and bending back.

As indicated by the filled circles in FIG. 16, the body 24 of the press-formed product 20 according to the inventive example of the present invention has a work-hardening distribution in which average hardness Hv1 of an area of the first region 27 at a position with a depth of 200 μm from a surface of the steel sheet 13 and average hardness Hv2 of an area of the second region 28 at a position with a depth of 200 μm from the surface of the steel sheet 13 satisfy a relationship of Hv1≈1.07×Hv2.

On the other hand, as indicated by the open squares in the graph in FIG. 16, the body 24 of the press-formed product according to a comparative example has a work-hardening distribution in which average hardness Hv1 of an area of a first region 27 at a position with a depth of 200 μm from a surface of a steel sheet 13 and average hardness Hv2 of an area of a second region 28 at a position with a depth of 200 μm from the surface of the steel sheet 13 satisfies a relationship of Hv1≈0.99×Hv2.

As described above, the body 24 of the press-formed product 20 according to the inventive example of the present invention has a novel work-hardening distribution resulting from press working, which the press-formed product according to the conventional press-formed product does not have, in the first region 27 in the vicinity of the shoulder portion 24c. Thus, an shock-absorbing member having a high crashing load with respect to a three-point bending load can be provided inexpensively, as a result of the shock-absorbing member including an shock-absorbing member formed by using the press-formed product 20 according to the inventive example of the present invention as a starting material.

The invention claimed is:

1. A press-formed product of a steel sheet having a body including a transverse cross section of a substantial channel shape, a substantial hat shape or a shape resulting from a combination of the substantial channel shape and the substantial hat shape, and extending in a direction, the transverse cross section including a bottom portion and a shoulder portion that is contiguous to the bottom portion through an R end characterized in that, a first region from the R end to a position a predetermined distance away in a direction in which the bottom portion extends, and a second region that is a part of the bottom portion and is contiguous to the first region in the transverse cross section have a work-hardening distribution introduced by press-forming of the body, at the shoulder portion, a front side has tensile stress and a back side has compressive stress;

at both ends of the transverse cross-section of the shoulder portion, a front side has compressive stress and a back side has tensile stress;

the work-hardening distribution: average hardness Hv1 of an area of the first region from a surface of the steel sheet to a position with a depth obtained by multiplying a thickness of the steel sheet by 0.2 and average hardness Hv2 of an area of the second region from the surface of the steel sheet to the position with the depth obtained by multiplying the thickness of the steel sheet by 0.2 satisfy a relationship of Hv1>1.05×Hv2.

2. The press-formed product according to claim 1, wherein the predetermined distance is 2 to 15 mm.

* * * * *